United States Patent
Varadarajan et al.

(10) Patent No.: US 8,160,144 B1
(45) Date of Patent: Apr. 17, 2012

(54) VIDEO MOTION ESTIMATION

(75) Inventors: Srenivas Varadarajan, Chennai (IN); Mihir Narendra Mody, Pune (IN); M V Ratna Reddy, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 1341 days.

(21) Appl. No.: 11/738,244

(22) Filed: Apr. 20, 2007

Related U.S. Application Data

(60) Provisional application No. 60/746,934, filed on May 10, 2006.

(51) Int. Cl.
*H04N 11/02* (2006.01)

(52) U.S. Cl. ............... 375/240.16; 375/240.12

(58) Field of Classification Search .......... 382/168; 375/240.16, 240.12
See application file for complete search history.

(56) References Cited

U.S. PATENT DOCUMENTS

| | | | |
|---|---|---|---|
| 6,269,174 B1 * | 7/2001 | Koba et al. | 382/107 |
| 7,515,634 B2 * | 4/2009 | Chang | 375/240.12 |
| 2005/0238103 A1 * | 10/2005 | Subramaniyan et al. | 375/240.16 |

* cited by examiner

*Primary Examiner* — Christopher Brown
(74) *Attorney, Agent, or Firm* — Mirna Abyad; Wade J. Brady, III; Frederick J. Telecky, Jr.

(57) ABSTRACT

Motion estimation in video encoding switches among motion estimation methods for successive predicted pictures depending upon statistics of prior pictures. Locally averaged motion vectors, fraction of intra-coded macroblocks, average quantization parameter, and so forth provide tests for applicability of particular motion estimation methods, such as ones which perform better for large motion or perform better for small motion with complex texture.

6 Claims, 9 Drawing Sheets

VIDEO MOTION ESTIMATION

CROSS-REFERENCE TO RELATED APPLICATIONS

This application claims priority from provisional patent application No. 60/746,934, filed May 10, 2006 and Indian patent application No. 715/CHE/2006, filed Apr. 19, 2006. The following co-assigned copending patent applications disclose related subject matter: Ser. No. 11/533,466, filed Sep. 20, 2006 and 60/727,369 filed Oct. 17, 2005 and Ser. No. 11/739,462 filed Apr. 24, 2007. These applications are herein incorporated by reference.

BACKGROUND

The present invention relates to digital video signal processing, and more particularly to devices and methods for video coding.

There are multiple applications for digital video communication and storage, and multiple international standards for video coding have been and are continuing to be developed. Low bit rate communications, such as, video telephony and conferencing, led to the H.261 standard with bit rates as multiples of 64 kbps, and the MPEG-1 standard provides picture quality comparable to that of VHS videotape. Subsequently, H.263, H.264/AVC, MPEG-2, and MPEG-4 standards have been promulgated.

At the core of all of these standards is the hybrid video coding technique of block motion compensation (prediction) plus transform coding of prediction error. Block motion compensation is used to remove temporal redundancy between successive pictures (frames or fields) by prediction from prior pictures, whereas transform coding is used to remove spatial redundancy within each block of both temporal and spatial prediction errors. FIGS. 2a-2b illustrate H.264/AVC functions which include a deblocking filter within the motion compensation loop to limit artifacts created at block edges.

Traditional block motion compensation schemes basically assume that between successive pictures an object in a scene undergoes a displacement in the x- and y-directions and these displacements define the components of a motion vector. Thus an object in one picture can be predicted from the object in a prior picture by using the object's motion vector. Block motion compensation simply partitions a picture into blocks and treats each block as an object and then finds its motion vector which locates the most-similar block in a prior picture (motion estimation). This simple assumption works out in a satisfactory fashion in most cases in practice, and thus block motion compensation has become the most widely used technique for temporal redundancy removal in video coding standards. Further, periodically pictures coded without motion compensation are inserted to avoid error propagation; blocks encoded without motion compensation are called intra-coded, and blocks encoded with motion compensation are called inter-coded.

Block motion compensation methods typically decompose a picture into macroblocks where each macroblock contains four 8×8 luminance (Y) blocks plus two 8×8 chrominance (Cb and Cr or U and V) blocks, although other block sizes, such as 4×4, are also used in H.264/AVC. The residual (prediction error) block can then be encoded (i.e., block transformation, transform coefficient quantization, entropy encoding). The transform of a block converts the pixel values of a block from the spatial domain into a frequency domain for quantization; this takes advantage of decorrelation and energy compaction of transforms such as the two-dimensional discrete cosine transform (DCT) or an integer transform approximating a DCT. For example, in MPEG and H.263, 8×8 blocks of DCT-coefficients are quantized, scanned into a one-dimensional sequence, and coded by using variable length coding (VLC). H.264/AVC uses an integer approximation to a 4×4 DCT for each of sixteen 4×4 Y blocks and eight 4×4 chrominance blocks per macroblock. Thus an inter-coded block is encoded as motion vector(s) plus quantized transformed residual block. And each motion vector can be coded as a predicted motion vector (from prior macroblocks in the same frame or from the co-located macroblock of a prior frame) plus a differential motion vector, typically with variable-length coding.

The motion estimation puts a heavy load on embedded processor architecture as follows.

1) Computation requirements: The number of multiply/adds required to find the best block match may be large. This is usually characterized as the number of sums of absolute differences (SADs) required to find the best match. In the case of an exhaustive search, for each location in the search area, one SAD calculation is required. This requires tremendous computation power. For example, video with D1 (720×480 pixels) resolution at 30 frames per second (30 fps) needs 41.4 Million SAD calculations per second using exhaustive search.

2) Data bandwidth requirement: Typically, reference frames are stored in external memory. Motion estimation requires the loading of reference search areas from external memory to internal memory. This consists of reference region fetching as well as the current macroblock. For example D1 resolution at 30 fps video needs 50 Mbytes/second assuming a search region of 32×32 for a given macroblock.

SUMMARY OF THE INVENTION

The present invention provides motion estimation for video with prior frame(s) used to predict motion vector range and thereby adaptively change between motion estimation modes.

DESCRIPTION OF THE PREFERRED EMBODIMENTS

1. Overview

Figure 1A:
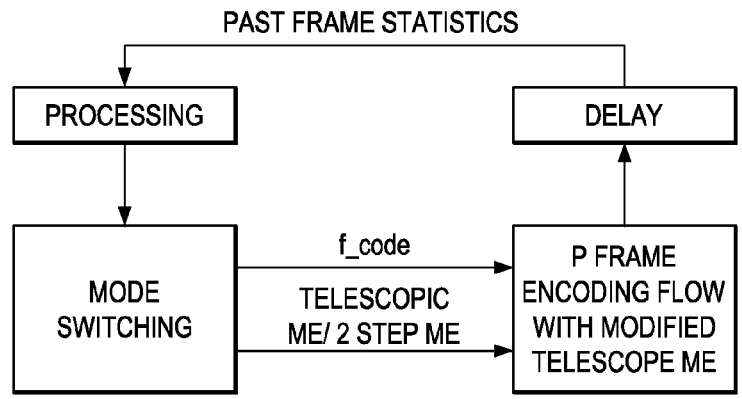
FIGS. 1a-1f are functional blocks, flowcharts, and search locations.
Figure 1B:
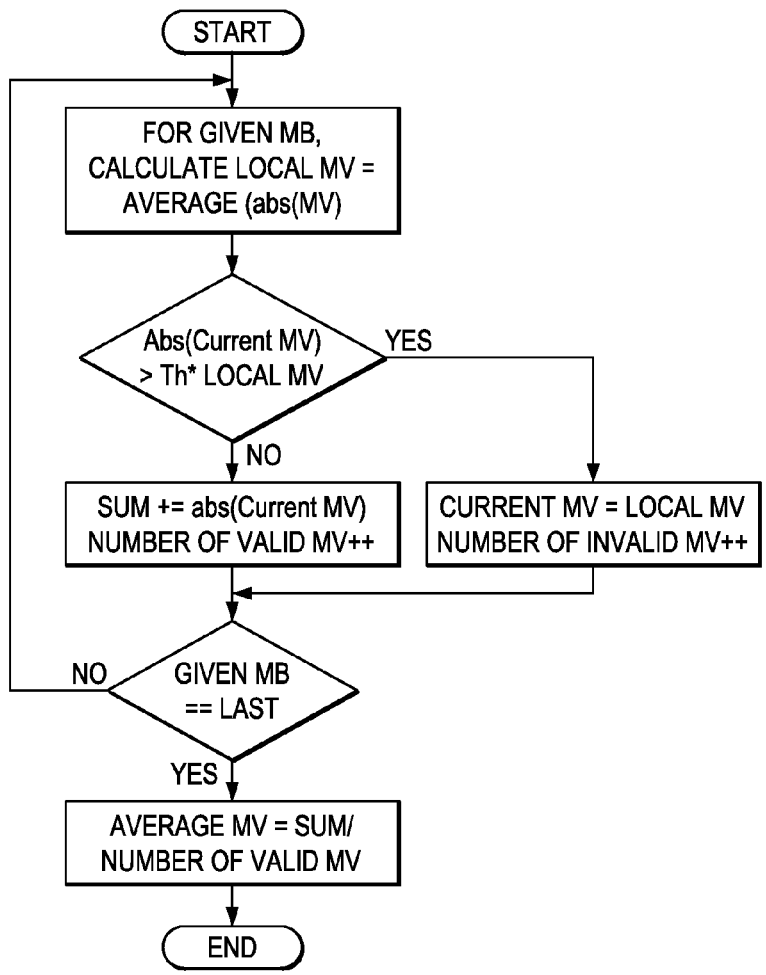
Figure 1C:
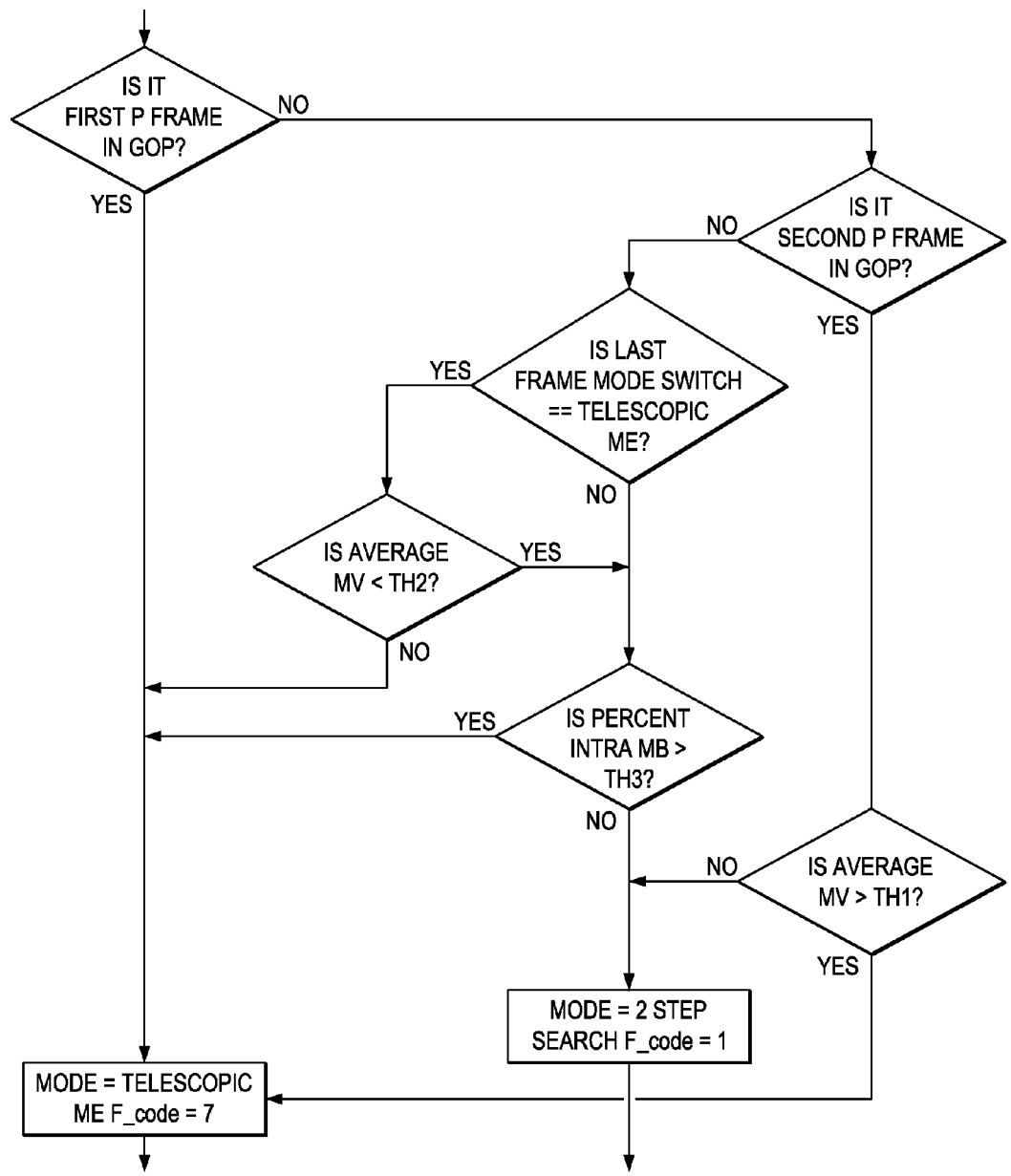
Figure 1D:
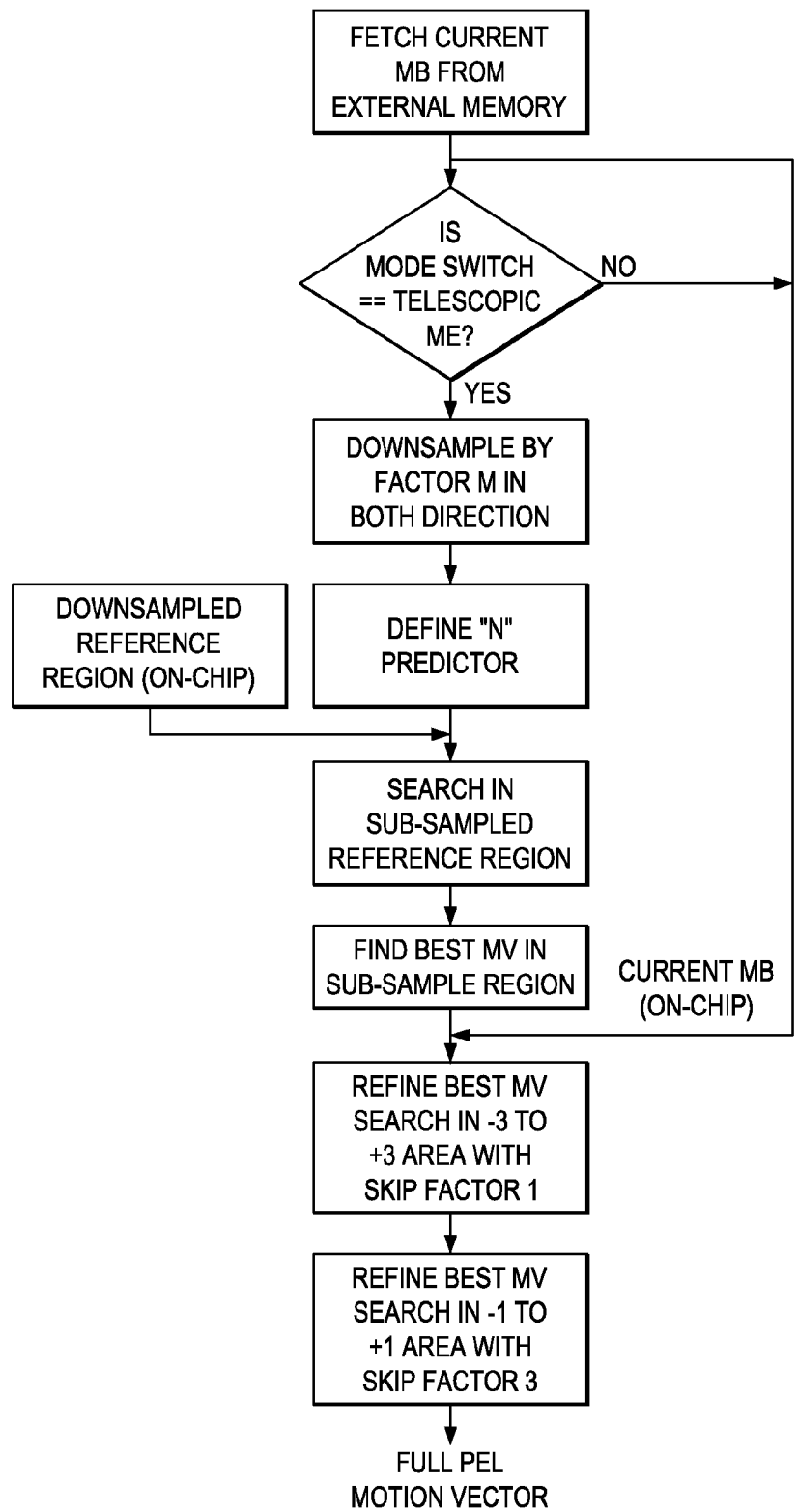

Preferred embodiment motion estimation methods use statistics from prior frames to limit the search range and adaptively switch between telescopic and 2-step searches. FIG. 1a shows functional blocks, and FIGS. 1b-1d are flowcharts for blocks of FIG. 1a. Prior frame statistics usable include averaged filtered motion vectors, the fraction of macroblocks intra coded, averaged quantization parameters, and so forth.

Figure 3B:
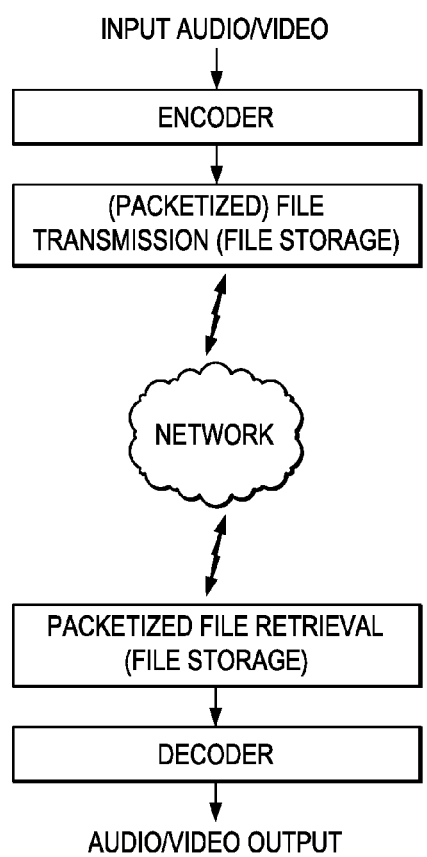
FIGS. 3a-3b illustrate a processor and packet network communications.
Figure 3A:
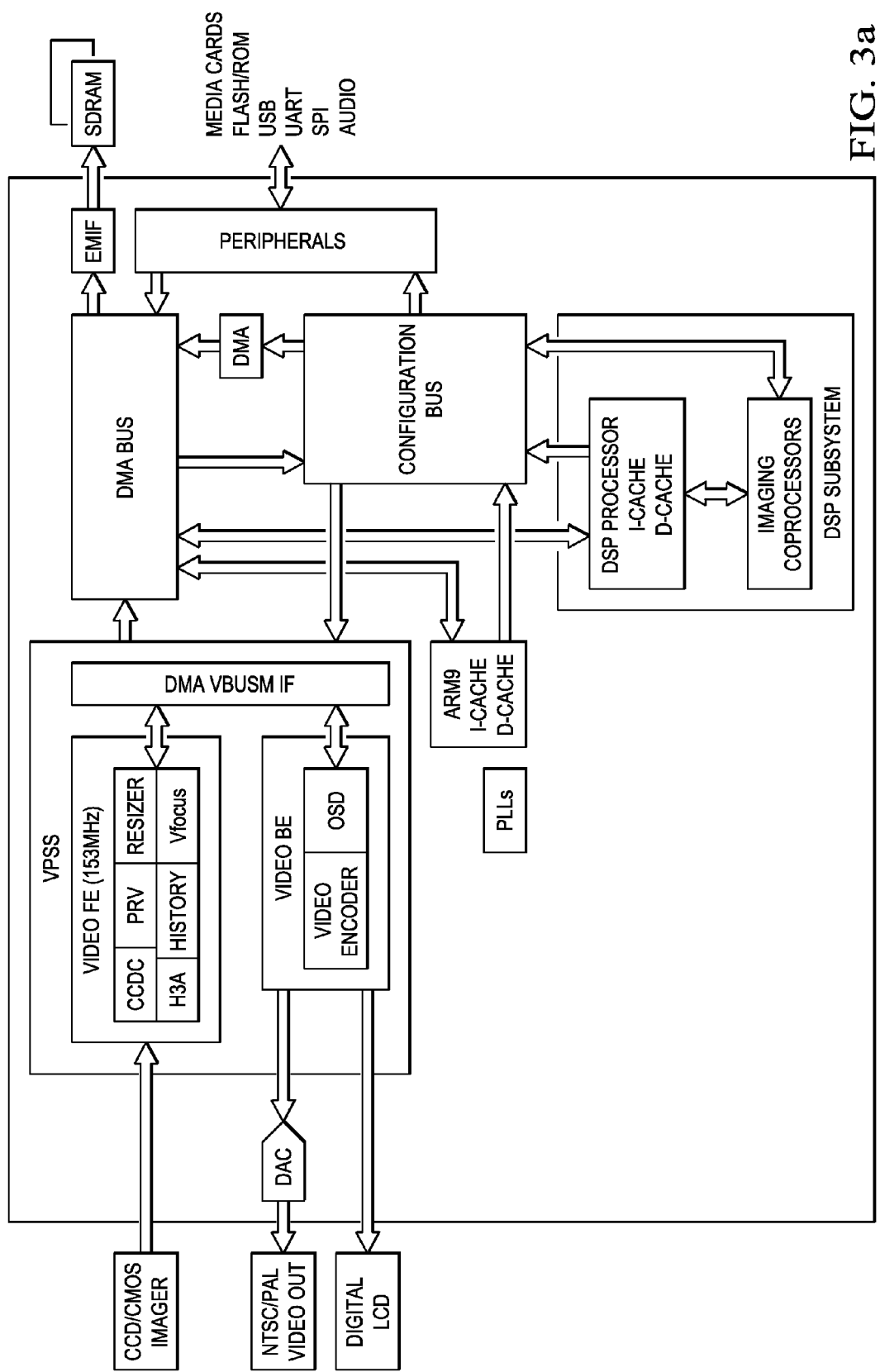

Preferred embodiment systems (e.g., camera cellphones, PDAs, digital cameras, notebook computers, etc.) perform preferred embodiment methods with any of several types of hardware, such as digital signal processors (DSPs), general purpose programmable processors, application specific circuits, or systems on a chip (SoC) such as multicore processor arrays or combinations such as a DSP and a RISC processor together with various specialized programmable accelerators (e.g., FIG. 3a). A stored program in an onboard or external (flash EEP)ROM or FRAM could implement the signal processing methods. Analog-to-digital and digital-to-analog converters can provide coupling to the analog world; modulators and demodulators (plus antennas for air interfaces such as for video on cellphones) can provide coupling for transmission waveforms; and packetizers can provide formats for transmission over networks such as the Internet as illustrated in FIG. 3b.

2. Motion Estimation Methods

First consider current motion estimation methods. Motion estimation (ME) is one of the traditional research areas in the field of video coding. A lot of research is done to reduce the computational requirements; such as:

By defining some fixed pattern in a search region instead of searching over the entire search area. For example, Three or Four step search, 2D log search, diamond search, Hierarchical search, so on.

By using motion vector predictors to define the best match as quickly as possible and refining it further.

The majority of work was done on the reduction of computational complexity and focused on lower resolution versions of frames. However, researchers have not focused much on other aspects like data bandwidth requirements. At higher resolutions, the amount of motion is usually larger compared to lower resolutions. This implies the use of a larger search area, which in turn increases complexity in terms of computation as well as data bandwidth.

One of the more important methods is Telescopic motion estimation which is widely used in VLIW architectures. Telescopic ME methods address computational complexity and data bandwidth issues for embedded architecture like VLIW for large resolutions.

Figure 1E:
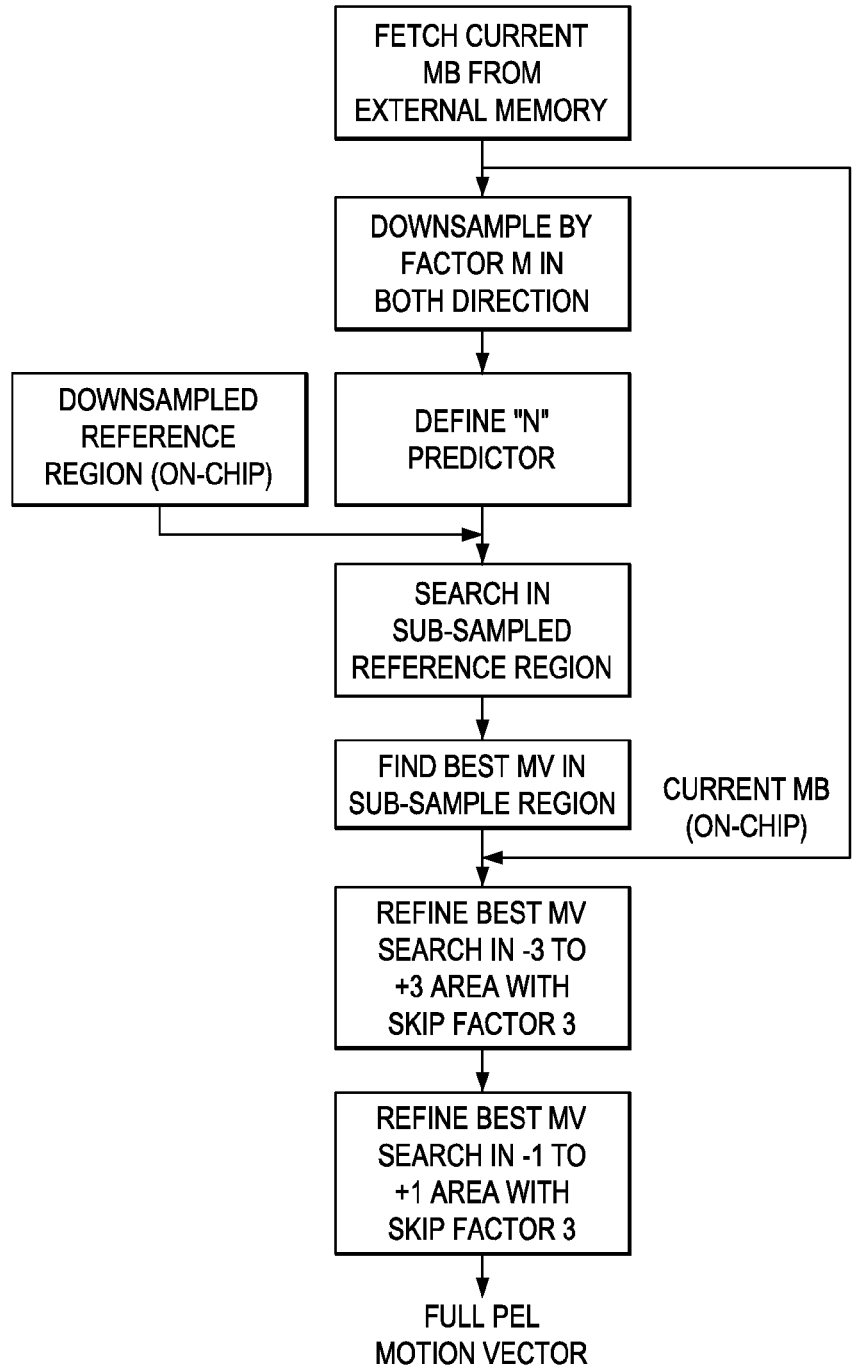

Telescopic ME methods use Hierarchical search along with predictors (spatial as well as temporal). As shown in FIG. 1e, Telescopic ME starts with down sampling the current macroblock (MB) by a factor of M (say 4) in both directions. An initial search is performed over a small area around motion vector predictors. The spatial predictors consist of neighboring MBs' motion vectors (MV), while a temporal predictor consists of the co-located MB in a reference frame region. In the case of a sub-sampled region, the sum of absolute differences (SAD) is calculated using M×M regions. The best candidate MV from the sub-sampled region is refined at full resolution in a smaller search area using a 2-step search.

Advantages of Telescopic ME:

The use of Hierarchical search (first downsampled, then full resolution) along with predictors allows searching over a large search area, which is required for high resolution formats like D1, 720p, 1080i, and so on.

The computation complexity is quite low due to the use of smaller search areas employed in sub-sampled and full resolutions. Also in case of sub-sampled regions, the complexity of SAD is reduced by factor of $M^2$.

The data bandwidth required is reduced by a large factor due to smaller search areas that need to be brought on-chip than the full resolution areas. Sub-sampled reference frames are usually stored on-chip during reconstruction of previous frames. This eliminates the need to load/store sub-sampled reference frames from external memory.

Disadvantages of Telescopic ME

Telescopic ME does not perform well in case of very low motion and/or high detail video sequences. The comparison of telescopic ME versus exhaustive search for some standard sequences is as follows.

| Sequence | Average Deviation (Telescopic Vs Exhaustive) |
|---|---|
| Football (D1) | 0.0 dB |
| Hp (D1) | −1.0 dB |
| Mobile (D1) | −1.3 dB |
| Tennis (D1) | −0.3 dB |
| Foreman (CIF) | −1.2 dB |

In the case of MPEG2 and MPEG4, the motion vector is encoded as a mixture of FLC (fix length of_code) and VLC (Variable length code). The number of FLC bits for the MV is constant for an entire frame. The field named "f_code" is used for this purpose in the video frame header, and f_code may be three bits to encode integers 1 . . . 7. In MPEG4 subclause 7.5.3 a motion vector is encoded as a predicted motion vector (component-wise median of motion vectors of neighboring macroblocks) plus a differential motion vector. The range (in half sample units) for components of motion vectors and differential motion vectors is from (−32)<<(f_code−1) to 32<<(f_code−1)−1. The differential motion vector components are each encoded in two parts: a variable length code of 1 to 13 bits and a variable length code of (f_code−1) bits.

Figure 4:
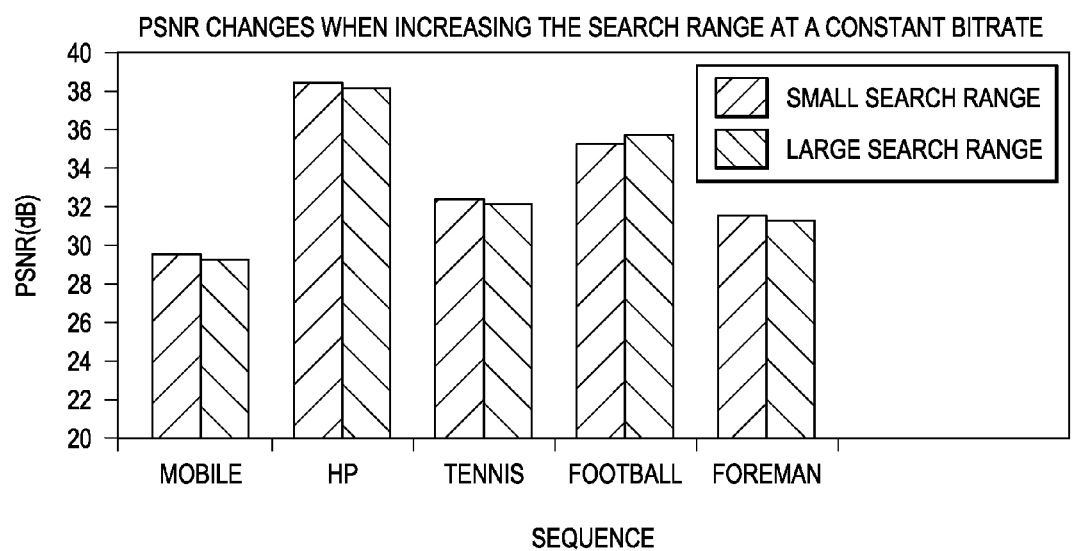
FIG. 4 shows experimental results.

In the case of Telescopic ME, the motion vector can be arbitrarily large. This will require large f_code, say 7, to be used to accommodate such large search ranges. In case of low motion and high detail sequences, the FLC bits are redundant for larger f_code values. For example, assuming MVs are restricted to a range of (−32 to 31), 0.48 Mbps (=2*6*1350*30) will be redundant for D1 frames at 30 fps for an f_code value of 7. This will reduce PSNR for this class of sequences as shown in FIG. 4.

An improved telescopic ME uses redundant predictors after Hierarchical search in full pixel resolution (see cross-referenced application Ser. No. 11/533,466). The following tables compare Telescopic ME with the improved telescopic ME: Method 1 is Telescopic ME, while Method 2 is the improved telescopic ME.

| | 2 Mbps | | 5 Mbps | | 8 Mbps | | Avg |
|---|---|---|---|---|---|---|---|
| Sequence | Method 1 | Method 2 | Method 1 | Method 2 | Method 1 | Method 2 | Gain (dB) |
| Mobile | 25.51 | 26.26 | 29.17 | 29.97 | 31.43 | 32.18 | 0.8 |
| Hp | 34.39 | 34.86 | 38.51 | 38.83 | 40.64 | 40.95 | 0.3 |
| Tennis | 29.67 | 29.92 | 32.71 | 32.91 | 34.59 | 34.78 | 0.2 |
| Football | 33.00 | 33.12 | 36.54 | 36.69 | 38.57 | 38.7 | 0.15 |

| | 288 kbps | | 384 kbps | | 768 kbps | | Avg |
|---|---|---|---|---|---|---|---|
| Sequence | Method 1 | Method 2 | Method 1 | Method 2 | Method 1 | Method 2 | Gain (dB) |
| Foreman | 29.89 | 30.15 | 31.16 | 31.44 | 33.91 | 34.21 | 0.3 |
| News | 35.02 | 35.14 | 36.50 | 36.55 | 39.46 | 39.47 | 0.05 |
| Akiyo | 40.40 | 40.45 | 41.54 | 41.58 | 43.39 | 43.41 | 0.04 |
| Football_cif | 30.19 | 30.19 | 30.45 | 30.47 | 33.77 | 33.91 | 0.02 |

Advantages of Improved Telescopic ME:

Able to track low motion/high details

A modest increase in number of SADs (around 4) for each MB

Disadvantages
> An increase in the data bandwidth requirement by 1024 bytes per block
> The spending of bits in f_code for low-motion/high-detail kind of video sequences.

There also has been research on hybrid/adaptive motion estimation methods. This involves identifying motion characteristics and switching between motion estimation methods based on this classification.

The simple methods use SAD at the co-located MB in the reference frame or the predicted MB. The SAD value is used to predict MV range (a large SAD implies large motion and vice versa). However, an experiment shows that this correlation does not hold good for a majority of video content.

Other hybrid methods use sophisticated measures like texture analysis or correlations to predict motion vectors. The main limitation of these methods is computational complexity and decision at the MB level, which prohibits real time implementation on embedded processors.

The previous methods apply motion estimation on an entire frame and determine f_code based on the range of the actual MV. This is not feasible solution for following scenarios in embedded systems.
> Memory constraints may force a designer to apply ME per MB rather than at the frame level.
> Multiprocessor or HWA accelerator based system, where ME for given MB happens in parallel with previous MB encoding.

3. Adaptive Motion Estimation with Prior Frame Statistics

Preferred embodiment adaptive motion estimation methods address constraints of embedded processor architectures, such as very long instruction word (VLIW). The methods include
> Use of past frame history to predict MV range (hence f_code) for a given range at the frame level
> Adaptively changing ME between Telescopic and 2-step search
> Use of special post-processing for previous MV information FIG. 1a is a block diagram of a preferred embodiment method, and FIGS. 1b-1d are flowcharts for the blocks of FIG. 1a.

The preferred embodiment ME methods switch between telescopic ME and 2-step ME (with lower search range) based on statistics of past frames. These adaptive ME methods work at the frame level to reduce computation complexity; this enables real time implementation.

In particular, during the start of a P frame encoding, process the motion vector information of the past P frame with a local-averaging filter which removes outliers in the motion vector data. The processed motion vectors along with some other statistic (e.g., the percentage of Intra MBs in the previous frame and average quantization parameter (QP) value of the previous frame) are given as input to the "mode switching" block of FIG. 1a.

Figure 1F:
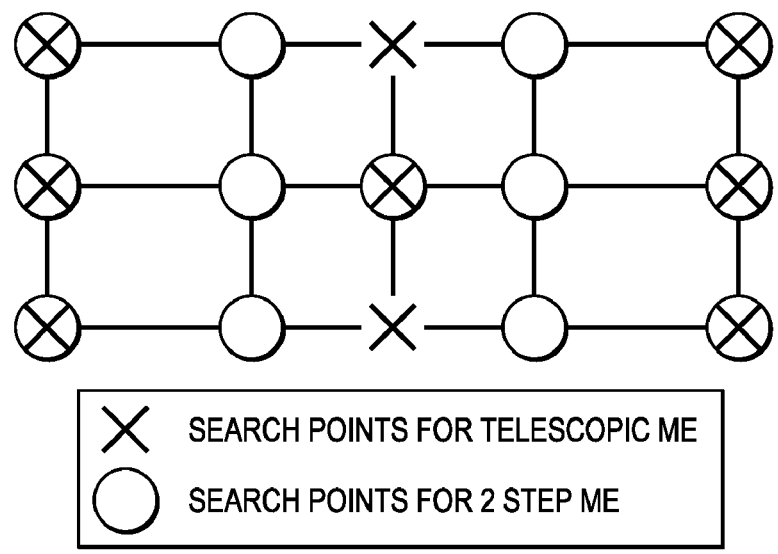
Figure 2C:
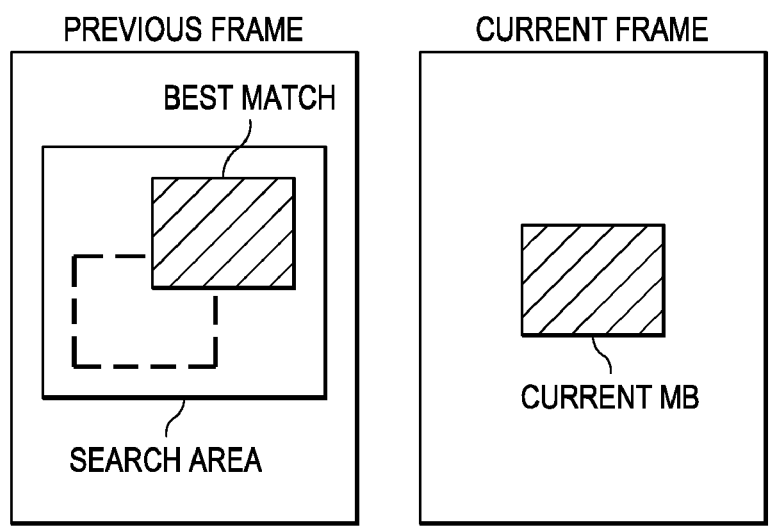
FIGS. 2a-2c show video coding functional blocks.
Figure 2A:
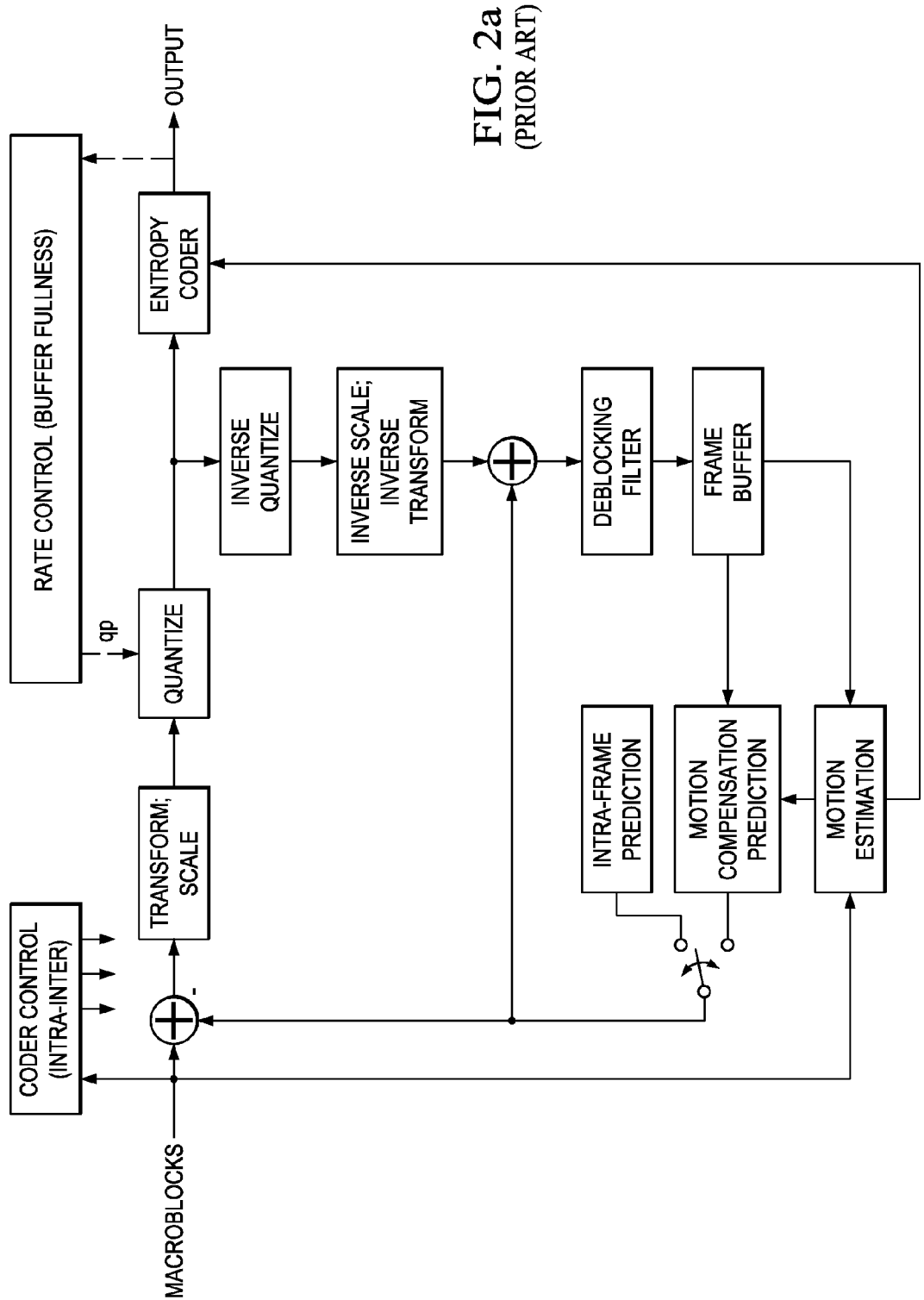
Figure 2B:
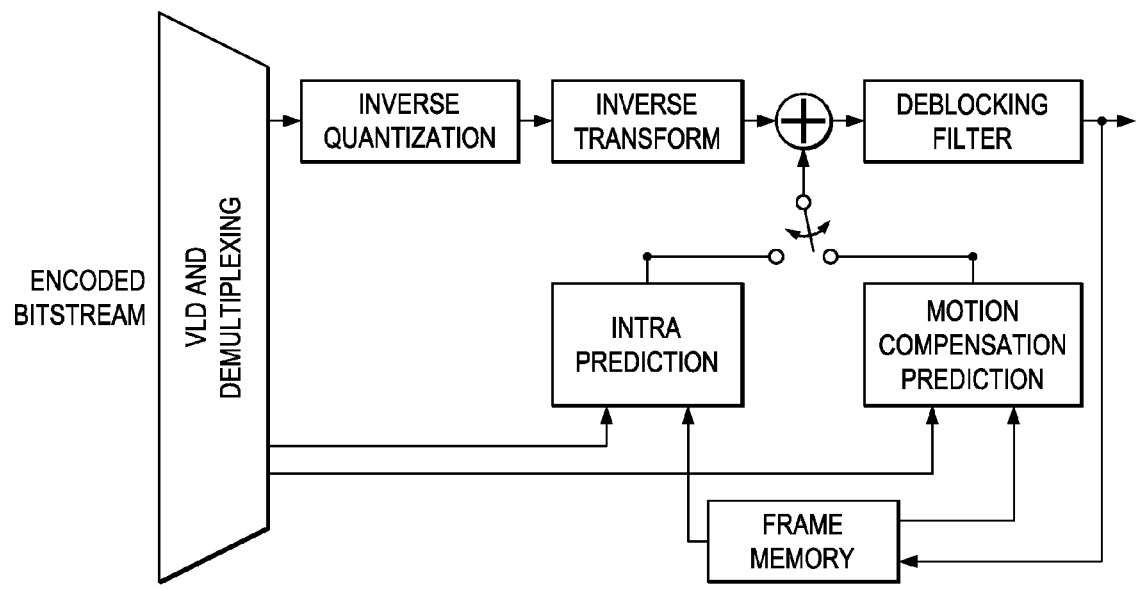

The mode switching module uses previous frame statistics (e.g. average motion vectors, average QP value, percentage of intra blocks, and its past decision). It assumes that the motion characteristics of a current frame closely match those of the previous frame. For smaller motion, it directs the encoder to use 2-step methods with f_code equal to 1. For higher motion, it directs the encoder to use telescopic ME with higher f_code, such as 6. The other parameters, e.g., percentage of intra MBs, average QP value, etc., are also used in this decision making process. The basic telescopic ME is modified to use the mode decision. During 2-step ME, higher resolution search is used in the area (−3, +3) to improve quality. FIG. 1f shows the search centers in both of these approaches.

FIG. 1b is a flowchart for processing the MVs of the prior encoded frame and includes the following steps.
(1) For each MB of the prior encoded frame:
  (a) average the magnitudes of the MVs of the 4 MBs neighboring the current MB to give a LocalMV for the current MB;
  (b) if the magnitude of the current MB's MV is greater than the product Th*LocalMV, then increment the counter InvalidMV. The threshold Th is typically taken to be in the range 1.2 Th 2.5;
  (c) else, if the magnitude of the current MB's MV is not greater than the product Th*LocalMV, then increment the counter ValidMV and add the magnitude of the current MB's MV to a Sum.
(2) Compute the output AverageMV as the Sum divided by the ValidMV counter contents.

FIG. 1c is a flowchart for the ME method decision (Telescopic or 2-step) for an input frame and includes the following steps:
(1) If the input frame is the first P frame in a group of pictures (GOP), then set the f_code equal to 7 (the maximum) and select Telescopic ME for the frame.
(2) If the input frame is the second P frame in the GOP, then compute the AverageMV from the first P frame in the GOP using the previously described steps of FIG. 1b. Next:
  (a) if AverageMV is greater than the threshold Th1, then set the f_code equal to 7 (the maximum) and select Telescopic ME for the frame. The threshold Th1 is typically taken to be in the range $3 \leq Th1 \leq 5$.
  (b) Else AverageMV is not greater than the threshold Th1, then set the f_code equal to 1 (the minimum) and select 2-step ME for the frame.
(3) If the input frame is the third or later P frame in the GOP and if the immediately prior P frame in the GOP had Telescopic ME, compute the AverageMV from the prior P frame in the GOP using the previously described steps of FIG. 1b. Next:
  (a) if AverageMV is greater than or equal to the threshold Th2, then set the f_code equal to 7 and select Telescopic ME for the input frame. The threshold Th2 is typically taken to be in the range $3 \leq Th2 \leq 4$. Th2 is always less than the threshold Th1.
  (b) Else if AverageMV is less than the threshold Th2 and if the number of intra MB of the prior frame is greater than the threshold Th3, then set the f_code equal to 7 and select Telescopic ME for the input frame. The threshold Th3 is typically taken to be in the range 0.05*number_of_MBs $Th3 \leq 0.20$*number_of_MBs.
  (c) Else if AverageMV is less than the threshold Th2 and if the number of intra MB of the prior frame is not greater than the threshold Th3, then set the f_code equal to 1 and select 2-step ME for the input frame.
(4) If the input frame is the third or later P frame in the GOP and if the last switch of ME mode for P frames in the GOP was from Telescopic to 2-step, then:
  (a) if the number of intra MB of the prior frame is greater than the threshold Th3, then set the f_code equal to 7 and select Telescopic ME for the input frame.
  (b) Else if the number of intra MB of the prior frame is not greater than the threshold Th3, then set the f_code equal to 1 and select 2-step ME for the input frame.

FIG. 1d is a flowchart for the modified Telescopic ME of FIG. 1a which is a Telescopic ME but with a mode decision prior the downsampling. If the mode is determined to be 2-step instead of Telescopic (as done in the FIGS. 1b-1c), then skip the downsampling plus related searching and effectively switch to the 2-step ME which refines predictor MVs as illustrated in the bottom two modules in FIG. 1d.

4. Experimental Results

The preferred embodiment was compared to the Telescopic ME. In the following tables Method 1 is Telescopic ME, while Method 2 is the preferred embodiment.

| Sequence | 2 Mbps | | 5 Mbps | | 8 Mbps | |
|---|---|---|---|---|---|---|
| | Method 1 | Method 2 | Method 1 | Method 2 | Method 1 | Method 2 |
| Mobile | 25.51 | 26.20 | 29.17 | 29.92 | 31.43 | 32.14 |
| HP | 34.39 | 34.41 | 38.51 | 38.52 | 40.64 | 40.65 |
| Tennis | 29.67 | 29.76 | 32.71 | 32.76 | 34.59 | 34.62 |
| Football | 33.00 | 33.00 | 36.54 | 36.54 | 38.57 | 38.57 |

| Sequence | 288 kbps | | 384 kbps | | 768 kbps | |
|---|---|---|---|---|---|---|
| | Method 1 | Method 2 | Method 1 | Method 2 | Method 1 | Method 2 |
| Foreman | 29.97 | 30.17 | 31.16 | 31.41 | 33.91 | 34.09 |
| News | 35.02 | 35.09 | 36.50 | 36.53 | 39.46 | 39.49 |
| Akiyo | 40.40 | 40.43 | 41.54 | 41.56 | 43.39 | 43.41 |
| Football_cif | 30.19 | 30.19 | 30.45 | 30.45 | 33.77 | 33.76 |

Advantages of the preferred embodiment methods

Able to track motion in low motion/high details as well as high motion/low details without degrading PSNR for other class of motion.

Marginal or no increase in SAD calculation requirements (As removal of predictor search in sub-sampled region offsets increase in number of SAD points in −3 to +3 region)

No increase in data bandwidth requirement

Able to save f_code bits in case of low motion/high detail contents

Frame-Level decision making for switching between algorithms.

The method works for a range of resolutions starting from QCIF to D1 and so on. (In the case of lower resolution, the sub-sampling factor in telescopic search will be lower)

5. Modifications

The preferred embodiments may be modified in various ways while retaining one or more of the features of frame ME mode switching based on prior frame statistics such as filtered average MV magnitude and fraction of MB intra encoded.

For example, rather than the fraction of intra MBs in the prior frame, the average quantization parameter could be used in the ME mode decision. Further, the various thresholds could be changed. Median filtering or low pass filtering could be used as a part of 'processing' stage in FIG. 1a. The mode switching module could support multiple motion estimation methods (along with f_code) instead of just a binary decision between only two ME methods as in FIG. 1a. Either progressive (frames) or interlaced (fields) pictures could be used with corresponding modifications.

What is claimed is:

1. A method of digital processor for motion estimation for video encoding, comprising the steps of:
(a) receiving via said digital processor an input picture from a plurality of time-ordered P pictures;
(b) when a second picture from said plurality had a first motion estimation method applied, where said second picture immediately precedes said input picture, computing an average of filtered motion vector magnitudes for said second picture;
(c) when said average from step (b) is not less than a first threshold, applying said first motion estimation method to said input picture;
(d) when said average from step (b) is less than said first threshold, computing a fraction of blocks of said second picture which were not encoded with motion estimation;
(e) when said fraction from step (d) is greater than a second threshold, applying said first motion estimation method to said input picture;
(f) when said fraction from step (d) is not greater than a second threshold, applying a second motion estimation method to said input picture;
(g) when said second picture had said second motion estimation method applied, computing at least a portion of the blocks of said second picture which were not encoded with motion estimation;
(h) when said portion from step (g) is greater than a second threshold, applying said first motion estimation method to said input picture; and
(i) when said portion from step (g) is not greater than a second threshold, applying said second motion estimation method to said input picture.

2. The method of claim 1, wherein said first motion estimation method is telescopic motion estimation and said second motion estimation method is two-step motion estimation.

3. The method of claim 1, wherein when said input picture is the first predicted picture in said plurality of pictures, applying said first motion estimation method.

4. The method of claim 1, wherein when said input picture is the second predicted picture in said plurality and said average motion vector is greater than a third threshold, applying said first motion estimation method.

5. The method of claim 4, wherein said first threshold is less than said third threshold and said second threshold is in the range of from 5% of the number of blocks in said second picture to 20% of the number of blocks in said second picture.

6. A digital camera, comprising:
(i) a sensor; and
(ii) circuitry for video processing and coupled to said sensor, said circuitry operable to motion compensate a sequence of pictures from said sensor, said motion compensation including:
(a) receiving an input picture from a plurality of time-ordered P pictures;
(b) when a second picture from said plurality had a first motion estimation method applied, where said second picture immediately precedes said input picture, computing an average of filtered motion vector magnitudes for said second picture;
(c) when said average from step (b) is not less than a first threshold, applying said first motion estimation method to said input picture;
(d) when said average from step (b) is less than said first threshold, computing a fraction of blocks of said second picture which were not encoded with motion estimation;
(e) when said fraction from step (d) is greater than a second threshold, applying said first motion estimation method to said input picture;

(f) when said fraction from step (d) is not greater than a second threshold, applying a second motion estimation method to said input picture;

(g) when said second picture had said second motion estimation method applied, computing at least a portion of the blocks of said second picture which were not encoded with motion estimation;

(h) when said portion from step (g) is greater than a second threshold, applying said first motion estimation method to said input picture; and (i) when said portion from step (g) is not greater than a second threshold, applying said second motion estimation method to said input picture.

* * * * *